United States Patent [19]
Roberts

[11] Patent Number: 5,097,627
[45] Date of Patent: *Mar. 24, 1992

[54] METHOD AND APPARATUS FOR HYDROPONIC GARDENING

[75] Inventor: David S. Roberts, Cheshire, Conn.

[73] Assignee: Gourmet Gardens Corporation, Cheshire, Conn.

[*] Notice: The portion of the term of this patent subsequent to Jun. 12, 2007 has been disclaimed.

[21] Appl. No.: 475,161

[22] Filed: Feb. 5, 1990

Related U.S. Application Data

[63] Continuation of Ser. No. 198,447, May 25, 1988, Pat. No. 4,932,158.

[51] Int. Cl.⁵ .............................................. A01G 31/02
[52] U.S. Cl. .............................................. 47/65; 47/64; 47/62
[58] Field of Search ....................... 47/59–65, 47/39, 81, 1.4, 79, 80, 85, 87, 73, 75, 18, 86

[56] References Cited

U.S. PATENT DOCUMENTS

| | | | |
|---|---|---|---|
| 762,014 | 6/1904 | Wittbold | 47/18 |
| 4,399,634 | 8/1983 | O'Hare | 47/59 |
| 4,617,755 | 10/1986 | Ikeda et al. | 47/65 |
| 4,780,989 | 11/1988 | Mears et al. | 47/65 |
| 4,932,158 | 6/1990 | Roberts | 47/65 |

FOREIGN PATENT DOCUMENTS 8502774  5/1987  Netherlands ................. 47/63

Primary Examiner—Danton D. DeMille
Attorney, Agent, or Firm—Bacon & Thomas

[57] ABSTRACT

Plants are hydroponically grown in a cellular water table provided with divergent grow lines along which plants are moved in plant holders. The grow lines are arranged to provide spacing between adjacent rows of plants as plants mature. Within each grow line is a variable pitch screw arrangement which provides for increased spacing between adjacent plants in a grow line as the plants mature. Four-way spacing is provided for both the leaves of the plants and their roots as the plants are suspended over the cellular water table. Maintenance of the system is facilitated by a crawl space beneath the water table which allows access to removable bottom panels of the individual cells within the water table. Plants are cultivated and serviced from the top by a man carrier system. $CO_2$ enriched air and/or pesticides are supplied directly to the undersides of the plants by a conduit system provided within each grow line. Nutrient enriched water is provided to the roots of the plants by a closed loop fluid circulation system.

2 Claims, 5 Drawing Sheets

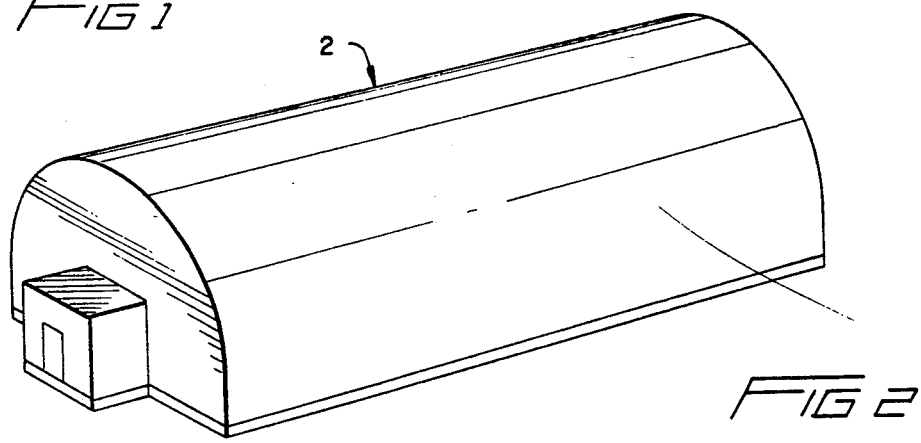
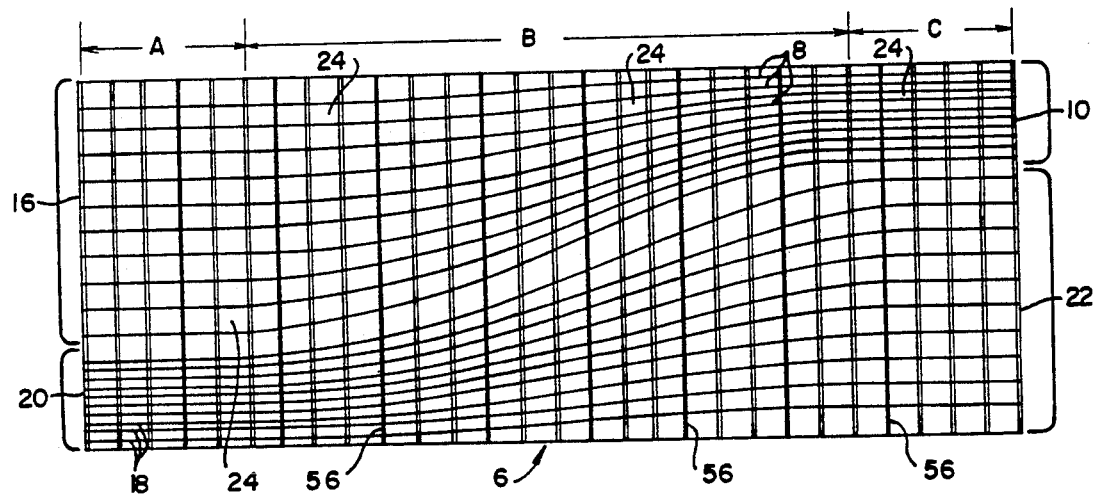
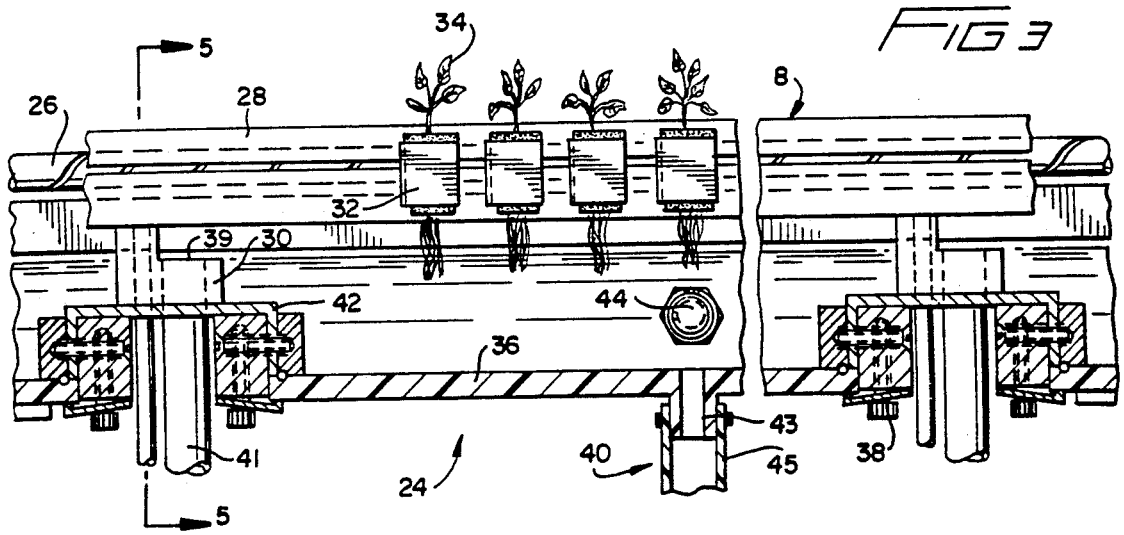

METHOD AND APPARATUS FOR HYDROPONIC GARDENING

CROSS REFERENCE TO RELATED APPLICATION

This application is a continuation of application Ser. No. 198,447, filed on May 25, 1988 now U.S. Pat. No. 4,932,158.

BACKGROUND OF THE INVENTION

1. Field of the Invention

This invention involves the field of technology pertaining to the growing of plants hydroponically, i.e., with enriched water and air. The invention relates to a method and apparatus for optimizing the yield per hydroponic greenhouse by controlling all of the variables which affect plant growth and to maximize greenhouse space utilization.

2. Description of the Prior Art

A common problem in many hydroponic plant growing operations is that the amount of space between individual plants is fixed and maintained from the date of planting until harvesting. This can result in an underutilization of available growing space and consequently the costs of production are greater than would be the case if available growing space were used in a more efficient manner.

Most growers of hydroponic products grow plants either in troughs at fixed spacing with nutrient water supplied at one or two places and drained at one or two ends, or in stationary pots, grow-blocks, or other devices providing physical support with the nutrient being dripped on, flowed through, or flowed around the support.

Prior attempts to alleviate the spacing problem in hydroponic farming are shown in Haub et al U.S. Pat. Nos. 4,337,986 and 4,216,618. These patents disclose a variable pitch screw arrangement for increasing the spacing between plants in accordance with their growth rate. However, these variable pitch screw arrangements are used in conjunction with a trough system in which the troughs are placed in parallel relation to each other. While this system allows for increased spacing between rows, it does not provide for automatic spacing between adjacent plants within a trough as they grow.

Davis et al U.S. Pat. No. 4,028,847 provides spacing between rows of plants by the use of a divergent track system. Young plants are first tended in growth chambers and then moved to tracks or troughs. This system does not provide for increased spacing between adjacent plants as they mature.

Another known system uses divergent troughs with a variable pitch screw arrangement which moves the plants along the troughs at gradually widening x-y spacings as they grow. This method provides appropriate space for leaves, but not for roots, which are confined within the available space of the trough. The roots tend to dam the free flow of nutrient water, causing the roots to turn brown, harbor disease, have less uniform development, etc. In addition, because this system is virtually inaccessible from the bottom, there is no way of removing sick plants without breaking off the roots, which remain in the trough and breed more disease.

SUMMARY OF THE INVENTION

The system of the invention is designed to realize the goals of (1) allowing each plant only as much space as it absolutely needs to grow, thereby making efficient use of costly greenhouse space; (2) being able to change this spacing according to the growth characteristics of different plant species; (3) supplying air, $CO_2$, nutrients, water and light in such a manner that product quality and uniformity are enhanced; (4) being able to apply pesticides only when needed and in such a maner that little or no residue is left on the plants; (5) providing the mechanical capability of cleaning the growing apparatus without taking the growth areas out of production; and (6) being able to inspect and cull the plants during production. The realization of these six goals serves to significantly reduce or eliminate some of the traditional problems of hydroponic farming, such as wasted space, uneven product quality, and disease and insect infestation.

It is therefore an important object of the present invention to provide a method and apparatus for the hydroponic growth of plants which provides four-way spacing for roots as well as for leaves, so that both roots and leaves have just enough growing space according to their stage of development, thereby optimizing the utilization of costly greenhouse space.

The object of the invention is achieved by providing an open gridwork formed by a frame wherein the intersecting frame members define individual "cells." Each cell is provided with a removable plastic bottom panel, which is preferably white, and which contains the water and nutrients within each cell. The framework is constructed within a "module" which is surrounded by a vertical, water-tight, structural enclosure to contain the water and maintain its level.

Suspended above the cells and resting on blocks on the frame are "grow lines," which may be formed from flexible material. These grow lines run divergently from one end of the module (the starting line) to the opposite end of the module (the harvest line), and carry out the twin functions of spreading out the plants as they grow and providing the growing plants with filtered and temperature controlled air, $CO_2$, nutrients and/or pesticides, as required. At the center of each grow line is a variable pitch screw to which plant holders are attached and which moves the plants when turned. The pitch of the screw is selected to correspond to the expected growth of the plants in the system. A plastic housing or extrusion surrounds the variable pitch screw and contains a system for carrying air which is enriched with $CO_2$, nutrients and/or pesticides to the plants. These ingredients, which are critical for successful plant growth, are directed at the underside of the leaves of the plants by a piping system contained within the plastic housing of the grow lines.

The ability to circulate the enriched air directly through the plant leaves is an important advantage in growing the plants rapidly. Air movement is also important to the growth of plants because it facilitates transpiration, plant cooling and uptake of carbon dioxide. The present invention provides for sterilized air, blown up through the leaves instead of over their tops, which air is adjusted for temperature and humidity. Furthermore, the ability to jet gaseous pesticides on the underside of the plant leaves, where insects are most often found, and only when needed, is a more effective means of controlling insect pests than traditional pesticide application, and minimizes residual particles on the leaves.

Plant holders are supported by and moved along the grow lines for containing individual plants which remain in the holders from seed to harvest. After germinating and growing in a nursery in the plant holder for an initial period, a group of seedlings is transferred to the grow lines with each plant holder being disposed in the plastic housing containing the variable pitch screw. The screw spaces the plant holders according to the growth curve of the plant as it moves them from starting point to harvest. If, at any point, an inspection indicates that a plant is sub-normal, the entire plant holder can be disassembled in place and the entire plant, including roots, removed, thereby reducing the possibility of spreading disease.

Each plant, therefore, begins at the starting line, at which point the first cell contains the appropriate nutrients for seedling growth. The roots of the plants are suspended in the water contained in the first cell. As the plant grows, the variable pitch screw within the grow line longitudinally separates the plant from its adjacent plants, while the divergent arrangement of the adjacent grow lines provides lateral separation of the plants. The roots of the plant pass from one cell to the next as the plant matures and each subsequent cell contains the appropriate proportion of nutrients for the stage of growth of the plants. The roots are therefore permitted not only the optimum amount of nutrients at each stage of growth, but also four-way spacing between plants as they mature.

Within each rectangular module, one half of the grow lines are arranged divergently from starting line to harvest line. The other half of the grow lines diverge in the opposite direction, defining a sister half of the module, thus improving the efficiency with which space is used in the greenhouse.

The grow lines are preferably curved in their midsections, the curvature of which is correlated with the growth curve of the plants and the available greenhouse space to optimize utilization of same. The grow lines are rendered flexible by the selection of appropriate conventional construction materials and by their small cross-sectional diameters (about 2") compared to their preferred lengths (over 100', preferably 124' to 128'). The curvature of the grow lines ideally corresponds to the growth curve (plant size vs. age) of the particular crop. The first section, preferably the first one quarter, of each module contains grow lines which are parallel and close together from the starting line on one side of the module (because the daily increase in size of the plant is small when the plant is a seedling), and grow lines which are parallel and more widely spaced to the harvest line on the other side of the module (because at maturity the more widely spaced plants occupy a length of grow line equivalent to a number of days as seedlings). The midsections of the grow lines are curved according to the growth curve of the crop. The end section of the module is the reverse image of the first section. Thus, each end of the module contains spaced, parallel grow lines which contain plant holders with young plants. The grow lines begin to curve after a specified number of days to allow for four-way spacing of leaves and roots for each plant and to maximize the efficient use of the greenhouse space. After the plants have reached a certain size, their growth is less rapid and the grow lines are once again configured in parallel relation for the final period of growth and harvesting. Each end of the module, therefore, incorporates the more widely spaced, parallel grow lines, at the ends of which harvesting takes place.

Nutrients are supplied to each cell within each module by a nutrient supply arrangement, which may employ any conventional fluid circulation system. The invention delivers moderately-to-briskly moving, temperature controlled, sterilized water with balanced nutrients to each cell. The moderate-to-brisk movement of the nutrient water within each cell helps to keep the roots of the plants clean, healthy and pleasantly white. It also assures a full strength supply of nutrients and removes toxic plant wastes. Nutrient and pH levels are continually checked and replenished.

Each individual cell within each module may be accessed by laborers on dollies in a crawl space below the framework of the cellular water table. When it becomes necessary to clean a particular cell, the water level within the individual cell is lowered by opening a drain which is provided in a removable plastic bottom panel of each cell. When the water has drained from the individual cell, the plastic bottom panel is removed, and the cell can be maintained without disturbing plants in other cells within the module. The crawl space also provides for servicing of all piping and duct work.

The growing plants can be maintained from the top without the need for aisles between grow lines. Plants and grow lines are serviced by a mobile man carrier supported over the plants. Therefore, where aisles would be present in traditional greenhouses, the greenhouse space of the present invention is utilized by additional grow lines, thus reducing the per-plant space cost. Tracks are provided along the outside of each module, on which a repair/maintenance truck can ride. From this truck, the operator can remove diseased plants, replace light bulbs, and perform any maintenance at plant level and above.

The present invention further incorporates a lighting system for the cells wherein light fixtures may be moved directly over the plants on overcast days and out of the way on sunny days. As a result of this feature, artificial light can be used efficiently and in tandem with natural sunlight to encourage efficient plant growth.

The entire apparatus of the invention is surrounded by a conventional greenhouse structure having a concrete floor, and a sterile entry.

Other objects, features and advantges of the invention shall become apparent from the following detailed description of preferred embodiments thereof when taken in conjunction with the drawings wherein like reference characters refer to corresponding parts in the several views.

BRIEF DESCRIPTION OF THE DRAWINGS

FIG. 1 is a perspective view of the exterior of a green house.

FIG. 2 is a schematic view of the layout of grow lines for one module.

FIG. 3 is a partial section of a cell taken along lines 3—3 of FIG. 4.

DETAILED DESCRIPTION OF THE PREFERRED EMBODIMENTS

FIG. 1 depicts the exterior of a conventional greenhouse 2 having a sterile entry way 4. The sterile entry way 4 allows for laborers to cleanse themselves, following clean room procedures, of any contaminants which they may otherwise bring into the hydroponic environment and thereby reduce the risk of disease to the plants. The greenhouse 2 may be of conventional structure and dimensions, and preferably runs east to west along its length. The greenhouse 2 is preferably provided with a poured concrete floor (not shown) to facilitate maintenance of greenhouse hygiene.

Figure 7:
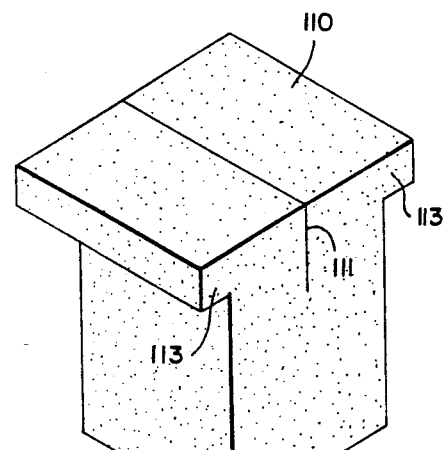
FIG. 7 is a partial sectional view of the greenhouse of FIG. 1.

FIG. 7 depicts a partial section of the interior of greenhouse 2 according to the present invention. The greenhouse 2 is provided with one or more modules 6, each of which is preferably rectangular in configuration, and defines a water table or growing area for the hydroponic system of the invention. Module 6 is supported by legs 52 over a crawl space 54. A mobile man carrier 90 rides on tracks 91 along the longitudinal sides of each module 6, and may bridge the open space between adjacent modules 6. Floor 92, which may be of poured concrete, is intended to promote hygiene within the greenhouse. Suspended above modules 6 are a plurality of retractable lights 94 which may be moved over the plants when sunlight is inadequate or unavailable and moved to the side of the greenhouse when sunlight is abundant or adequate. Lights 94 are suspended from a rod 96 by conventional means which facilitate their retraction, such as roller and track assemblies. A conventional air circulation means 98 is also provided within the greenhouse to evaporate spills and prevent air stagnation.

FIG. 2 schematically depicts module 6 according to the invention. Each module 6 may be any desirable length and width, but is preferably about 124' to 128' long and about 8' wide. The module 6 contains a plurality of transverse cells 24 which collectively define a cellular water table. The cells 24 are defined by the structural framework of the module 6 as more fully discussed below. Supported above the cells 24 and extending longitudinally of module 6 are flexible grow lines 8 and 18. The grow lines 8 and 18 support the plants which are to be grown in the hydroponic system of the invention, and move the plants from one end of the module 6 to the other by means which are more fully described below.

Grow lines 8 and 18 are arranged within the module 6 to optimize space utilization, while allowing the individual plants sufficient space for their leaves and roots to grow. Grow lines 8 are shown to emanate from starting line 10 in a narrower parallel fashion through a section C of the module 6. The grow lines 8 then begin to curve slightly according to the growth curve (individual plant size as a function of age) of the crop. Table I presents sample calculations (for lettuce) for screw pitch within and spacing between grow lines relative to plant size and age ("days in grow out").

TABLE 1
RELATING PLANT SIZE & AGE TO SCREW PITCH & DISTANCE

| Days in Grow-out | Plant Size (in) | Plant Spacing* (in) | Screw Length (in) | Cumulative Length (in) | Reverse Cumulative Length (in) | Screw Pitch (turns/in) |
|---|---|---|---|---|---|---|
| 1 | 1 | 1.50 | 37.50 | 37.50 | 1536.00 | 6.66 |
| 2 |   | 1.50 | 37.50 | 75.00 | 1498.50 | 6.66 |
| 3 |   | 2.00 | 50.00 | 125.00 | 1461.00 | 5.00 |
| 4 | 2 | 2.00 | 50.00 | 175.00 | 1411.00 | 5.00 |
| 5 |   | 2.25 | 56.25 | 231.25 | 1361.00 | 4.44 |
| 6 | 2 | 2.25 | 56.25 | 287.50 | 1304.75 | 4.44 |
| 7 |   | 2.50 | 62.50 | 350.00 | 1248.50 | 4.00 |
| 8 |   | 2.75 | 68.75 | 418.75 | 1186.00 | 3.64 |
| 9 |   | 3.00 | 75.00 | 493.75 | 1117.25 | 3.33 |
| 10 |   | 3.25 | 81.25 | 575.00 | 1042.25 | 3.08 |
| 11 | 3 | 3.50 | 87.50 | 662.50 | 961.00 | 2.86 |
| 12 |   | 4.00 | 100.00 | 762.50 | 873.50 | 2.50 |
| 13 |   | 4.50 | 112.50 | 875.00 | 773.50 | 2.22 |
| 14 | 4 | 5.25 | 131.25 | 1006.25 | 661.00 | 1.90 |
| 15 | 5 | 6.25 | 156.25 | 1162.50 | 529.75 | 1.60 |
| 16 | 6 | 7.25 | 181.25 | 1343.75 | 373.50 | 1.38 |
| 17 | 7 | 7.69 | 192.25 | 1536.00 | 192.25 | 1.30 |

*Note:
At least one day ahead of growth curve. Axial (Longitudinal) plant spacing is calculated according to size of plant plus room for growth. Lateral plant spacing (between grow lines) is laid out using the longitudinal spacing as a guide within the physical confines of the design. Thus, at planting end, spacing is 2", not 1.5" because of interferences. At harvest it is 6", a width suited to the width of the module and representative of good commercial production. This parallel 6" and 2" spacing is sufficient for ¼ of the length (384") of each end, and the middle half is blended in to approximate the longitudinal spacing for each day of the growth curve.

As also shown in FIG. 2, the grow lines 8 continue to diverge and curve according to the growth curve of the crop through an intermediate section B of the module 6 until the plants have reached maturity in size. The grow lines 8 then proceed to harvest line 16 in a wider parallel fashion through a section A of the module 6.

Grow lines 18 traverse the module in opposite relation to grow lines 8. Grow lines 18 emanate from starting line 20 in a narrower parallel fashion through section A of the module 6, at which time the grow lines 18 begin to curve out to accommodate the growth needs of the plant. The grow lines 18 continue to curve out through intermediate section B of the module 6. The grow lines 18 again become parallel in wider spacing and proceed to harvest line 22 in this manner through section C of the module 6. Thus, at each end of the module 6, both harvesting and plant entry into the system take place. These ends form transverse walls of the module.

Figure 4:
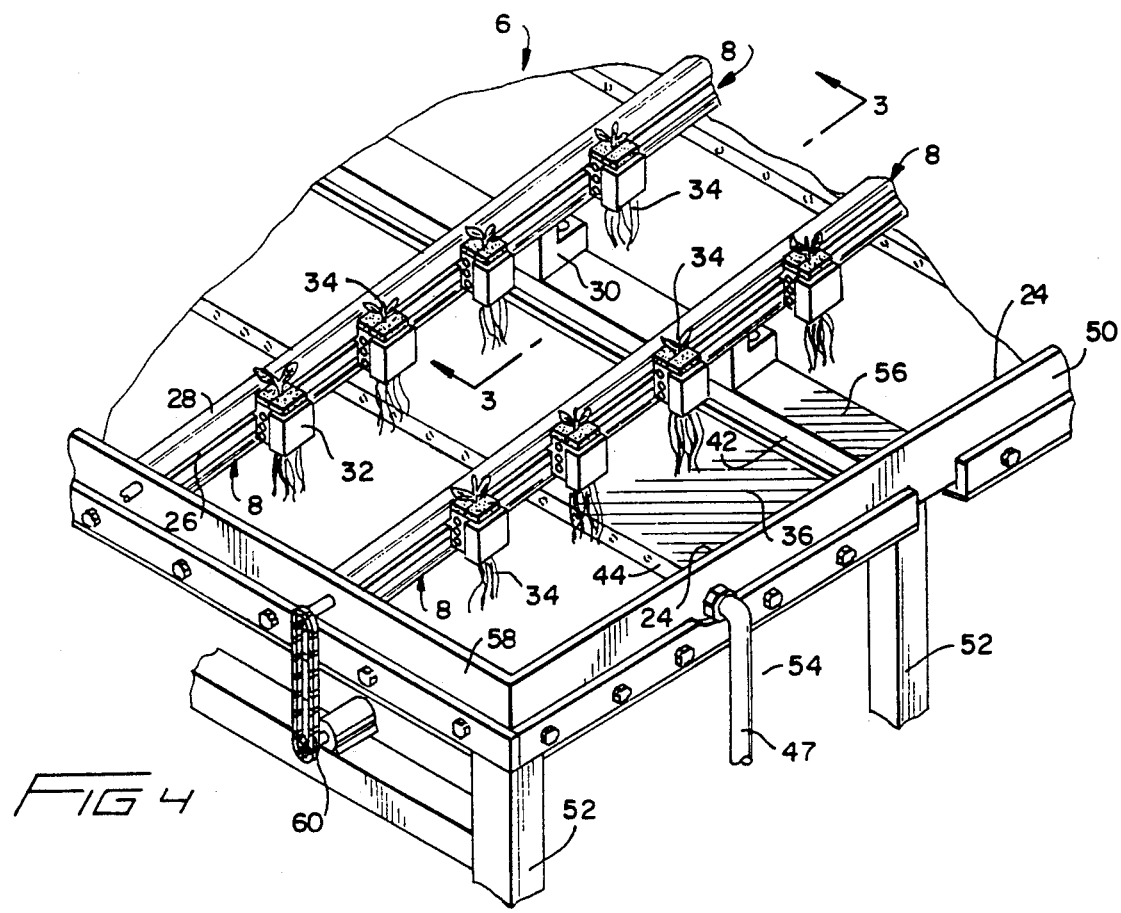
FIG. 4 is a fragmented perspective view of a module.

FIG. 4 depicts a fragmented section of module 6 according to the invention. A pair of opposed longitudinal walls 50 (only one shown) and a pair of opposed transverse walls 58 (only one shown), which may be constructed of any suitable material, are provided to form the periphery of module 6. The walls 50 and 58 are supported in a raised position by a plurality of legs 52 which may be any height (preferably about 4') which allows for a crawl space 54 beneath module 6. The crawl space 54 facilitates the maintenance of the system by permitting access to the bottom of the module 6 by laborers on conventional dollies (not shown). All of the piping and paneling of the system may be serviced from crawl space 54. The legs 52 may be constructed of any suitable material. The legs 52 are provided at evenly spaced intervals, preferably about every 4', along the longitudinal walls 50 of the module 6 and at the corners of the rectangle which is formed by the intersection of the longitudinal walls 50 with the transverse walls 58.

A gridwork of cells 24, each of which may be of any appropriate dimensions, but which are preferably approximately 4' by 8', is formed by extending a plurality of structural members 56 across the width of the module 6 in parallel relation to the transverse walls 58 of the module 6. The structural members 56 are supported by and attached to legs 52 by conventional means. The structural members 56 form sills 42 of the cells 24 parallel to transverse walls 58 of the module. The longitudinal walls 50 define the sides of the cells 24. The height of sills 42 is less than the height of walls 50 and 58 to permit fluid communication between cells 24.

Each cell 24 is provided with a removable bottom panel 36 to contain the nutrient enriched water used in cell 24. Within each cell 24 and in parallel relation to structural members 56 and transverse walls 58 of the module 6 is provided a closed loop perforated pipe 44 to provide recirculation of nutrient enriched water from a supply line 47. The recirculation system (not shown) connected to supply line 47 may be any conventional pumping and storage system. The recirculating system delivers a measured mixture of temperature controlled, sterilized water and balanced nutrients briskly to a plurality of plants 34. The nutrient enriched water is piped from a storage tank (not shown), filtered, sterilized and circulated through the roots of the plants 34. After feeding the plants 34 and washing away plant wastes, the solution is piped back through perforated pipe 44 to the storage tank, where nutrients are replenished and the pH level is monitored and adjusted, if necessary. When the controlled water is delivered back to the cells 24, it is directed briskly at the roots of the plants 34 by perforated pipe 44. The brisk movement of the water promotes the health of the roots and maintains their natural color. It also efficiently removes toxic plant wastes.

A plurality of support blocks 30, which may be of stepped configuration and formed of aluminum, are situated on structural members 56 to support grow lines 8 which are anchored at their opposite ends to transverse walls 58 and driven by a conventional chain drive system 60. The grow lines 8 are spaced apart from each other according to the growth needs of the particular crop being raised in the manner previously described herein. A variable pitch screw 26 is contained within a screw housing 28, which may be formed of plastic, within each grow line 8. The variable pitch screw 26 is rotated by chain drive system 60 and serves to move the plants 34 which are contained in a plurality of plant holders 32 across the module 6. Plant holders 32 are spaced along the grow lines 8 according to the growth needs of the particular crop being raised to provide adequate spacing between adjacent plants 34. The longitudinal spacing of the plant holders 32 is effected by the use of variable pitch screw 26 in a manner more fully discussed below.

FIG. 3 depicts a partial section of a cell 24 according to the invention. Flexible grow line 8, incorporating variable pitch screw 26 through screw housing 28, is suspended above the cells 24 by support blocks 30. The pitch of the variable pitch screw 26 is fine at the beginning of the grow line 8 and gradually expands as the end of the grow line 8 is approached. Plant holders 32 are attached to the variable pitch screw 26 within screw housing 28. The plants 34 within plant holders 32 are spaced progressively apart from one another as they mature by turning the variable pitch screw 26 either manually or by use of the chain drive system 60 previously described with reference to FIG. 4.

The roots of the plants 34 extend into the nutrient enriched water of the hydroponic system of the invention. The water level within the module 6 is substantially controlled by the perforated pipe 44 of the recirculation system within each cell. A plurality of draining means 41 are also provided to prevent overflow of the water out of the module 6. Each cell 24 is provided with a removable bottom panel 36, which is preferably white. A white bottom panel reflects light back up to the plants and maximizes utilization of available light. The removable bottom panel 36 is affixed to the cell 24 by retaining means 38, which may be any means known to one of ordinary skill in the art, but which is represented herein by a clamping bar. The water level within the module 6 is maintained above the sills 42 of each individual cell 24 at the level of a plurality of drain holes 39 of draining means 41 during normal operation of the system according to the present invention. This allows the roots of the plants to reach the nutrient water while being transported along the grow lines 8 and 18 without physical interference from the sills 42 of the cells 24. When maintenance of an individual cell is necessary, the water level of the entire module 6 is dropped to below the level of the sills 42 by means of recirculation system 44.

Each removable bottom panel 36 is provided with a plurality of cell draining means 40. Each cell draining means 40 includes a downwardly directed spout 43 to which is attached a hose 45. When the draining means 40 are not desired to be in operation, then hose 45 may be clamped by a conventional clamping means (not shown). When it is desired to clean the cell 24, the water level of the module 6 is lowered to a level beneath the sills 42 of the cell 24, as described above. Hose 45 attached to spout 43 of the cell draining means 40 is unclamped and the water within the cell 24 is allowed to drain out of the cell 24. The bottom panel 36 of the cell 24 is then removed, and the entire cell 24 may be cleaned without disturbing the activity in neighboring cells. When the cell 24 has been cleaned, the water level is restored to its operating level.

Figure 5:
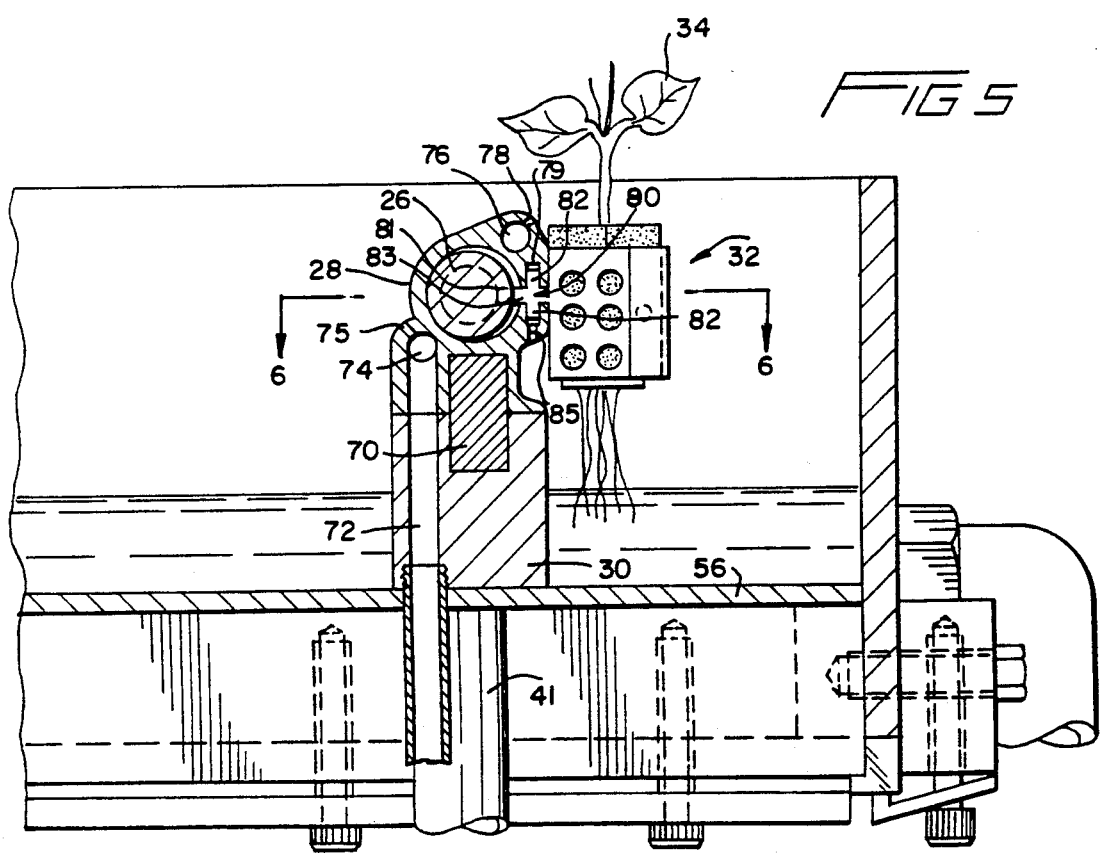
FIG. 5 is a sectional view taken along lines 5—5 of FIG. 3.

FIG. 5 depicts a section of a grow line according to the invention. Support block 30 is shown supported by structural member 56. Support block 30 incorporates draining means 41, a reinforcing support bar 70, which may be of any conventional support material, and an air supply inlet 72. The reinforcing support bar 70 and the air supply inlet 72 extend into the screw housing 28 and along its length, with housing 28 being formed of any material, preferably plastic. The reinforcing support bar 70 functions to retain the screw housing 28 in place in the apparatus. The air supply inlet 72 is provided with a conduit 74 and a conduit 76, each having a plurality of apertures 75 and 78, respectively.

Conduit 76 delivers $CO_2$ enriched air to the underside of the plant leaves. The conduit 76 may also be used to apply gaseous pesticides to the crops grown according to the method of the present invention. The apertures 78 in the conduit 76 are spaced over short distances such that each plant 34 in the system is provided with fresh $CO_2$ enriched air and/or pesticides, as necessary. The provision of $CO_2$ enriched air directly up through the leaves is critical for the prevention of diseases which are nurtured by moisture, because the $CO_2$ enriched air dries the leaves. The provision of fresh air continuously up through the leaves also prevents stagnant air from coating the leaves. CO$_2$ enriched air provided directly through the leaf canopy can increase yields by 20-30% and can compensate for low light levels.

Plant holder 32 is provided with an engagement means 80 that includes a pair of outwardly extending guide ribs 82, which slidingly engage guide grooves 79 of the screw housing 28, and a horizontal protrusion 83 which extends through screw housing 28 into sliding engagement with a helical groove 81 of the variable pitch screw 26. As seen in FIG. 5, engagement means 80 supports holder 32 over the water of cell 24 in a cantilever manner. As the screw 26 is turned, the plant holder 32 is moved along the grow line and spaced progressively apart from its adjacent plant holders 32 by the pitch of the screw 26. Plant holder 32 is secured in its vertical position by guide grooves 79 which collectively define a longitudinal slot in housing 28 that extends for substantially the entire length of screw 26. Engagement means 80 of plant holder 32 may be made of any conventional low-friction material. A drainage hole 85 is provided under the guide rib 82 to permit drainage of moisture and other materials which may potentially clog guide grooves 79 of screw housing 28.

Figure 6:
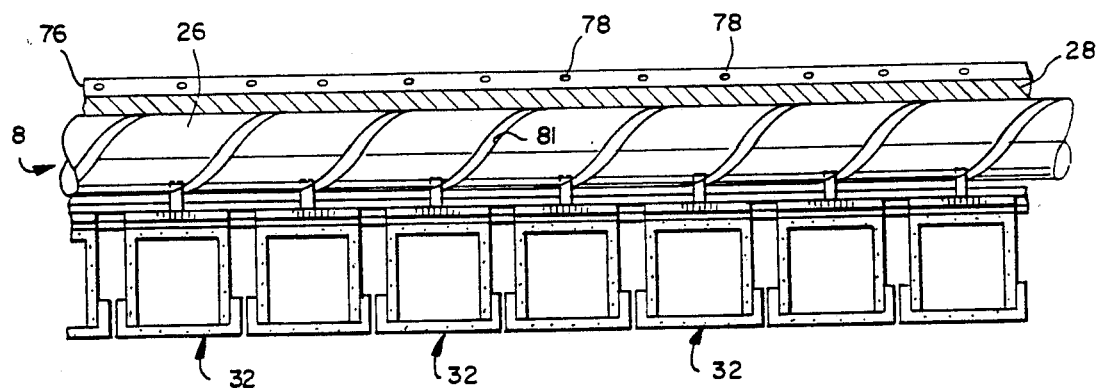
FIG. 6 is a section taken at line 6—6 of FIG. 5.

FIG. 6 depicts variable pitch screw 26 with closely spaced plant holders 32 engaged with helical groove 81. The arrangement depicted is that of the plant holders 32 at the initial stages of the process, wherein the pitch of the screw is fine and the plants are close together. As the plants mature, the plant holders 32 are spaced increasingly farther apart along the length of grow line 8, due to the change in pitch of screw 26. Plant holders 32 allow for the rapid removal of diseased plants from the system. FIG. 6 further shows a plurality of spaced apertures 78 in air piping system 76 contained in screw housing 28, which direct CO$_2$ enriched air and/or gaseous pesticides at the undersides of the leaves of the plants along the length of the grow line 8.

Figure 8:
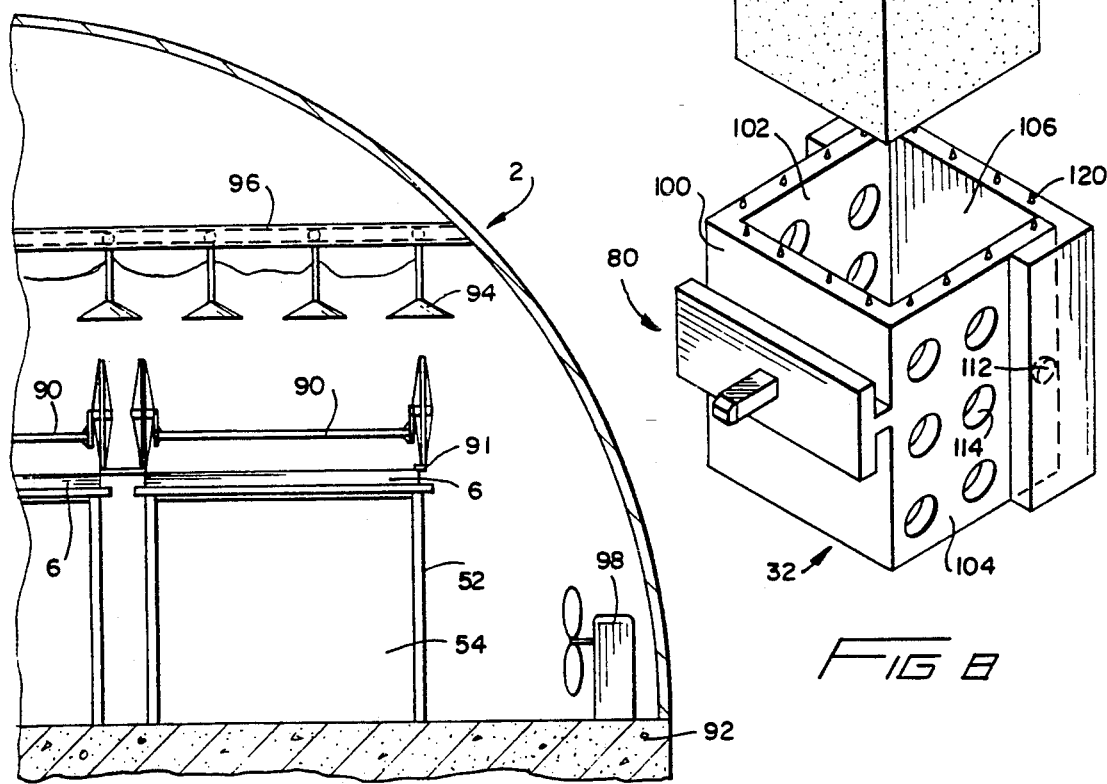
FIG. 8 is a perspective view of a plant holder.

FIG. 8 depicts plant holder 32 which may be constructed of any suitable, preferably light-weight, material. Plant holder 32 is provided with engagement means 80 extending from a solid first side 100. A second side 102, a third side 104 and a snap-on fourth side 106, in conjunction with solid first side 100, define an open-ended cavity. A die-cut sponge wick 110 provided with a slot 111 therein initially contains the germinating seed (not shown). Wick 110 is inserted into the cavity of plant holder 32. The fourth side 106 is detachably secured to sides 102 and 104 by an appropriate snapfit interengagement, shown generally at 112, on both sides of fourth side 106. As the seedling begins to emerge from the sponge wick 110, the plant holder 32 containing the nascent plant is introduced into grow line 8 according to the present invention, and is moved along the grow line 8 in the manner previously described until the plant reaches maturity and is harvested. If it is desired to remove a dead or diseased plant from the system, a laborer in mobile man carrier 90 can unsnap the fourth side 106 from the plant holder 32 and remove the sponge wick 110 containing the entire plant, including its roots. The removal of the entire plant from the system decreases the spread of disease and prevents damming of the water flow in the cellular water table. The second side 102 and the third side 104 of each plant holder 32 are provided with ventilation holes 114 to permit the passage of oxygen through the plant holder 32 and sponge wick 110, and thus to the roots of the growing plant contained therein. Sponge wick 110 is secured to the plant holder 32 by means of a plurality of spikes 120 provided around the upper periphery of holder 32 which engage outwardly directed flanges 113 of wick 110.

Figure 9:
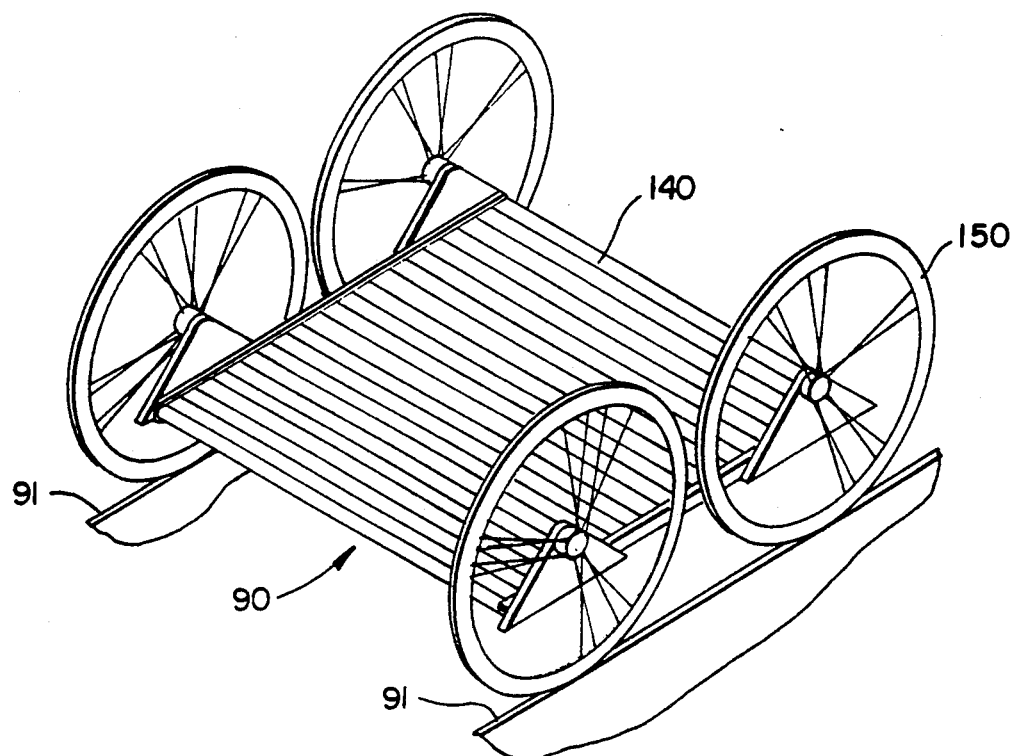
FIG. 9 is a perspective view of a truck serving as a mobile man carrier.

FIG. 9 depicts mobile man carrier 90 for use in connection with the present invention. The mobile man carrier 90 is constructed of wheels 150 having a supporting bed 140 attached thereto by conventional axle means (not shown).

Figure 10:
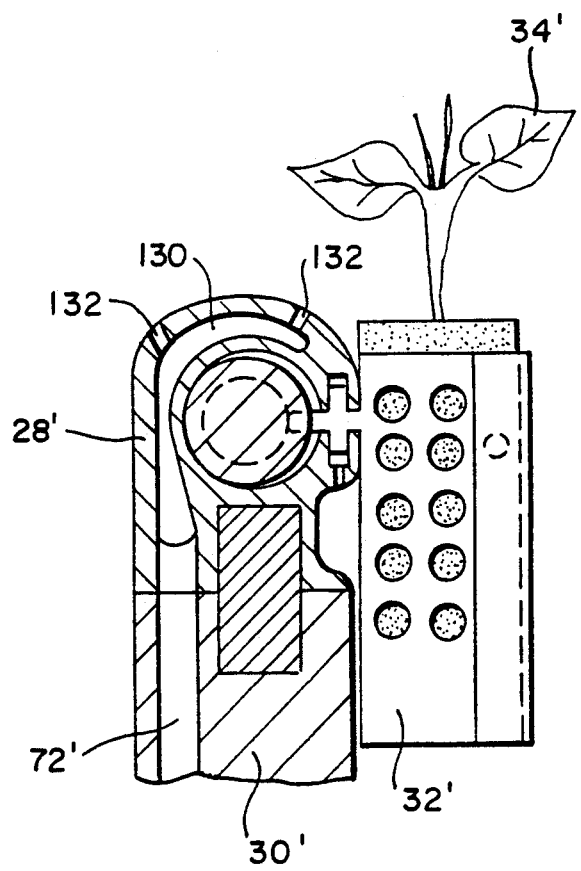
FIG. 10 is a partial view of an alternate embodiment of the screw housing shown in FIG. 5.

FIG. 10 depicts an alternate embodiment of a screw housing 28' and a plant holder 32' according to the present invention. Screw housing 28' is provided with a perforated air piping channel 130 which transports CO$_2$ enriched air and/or gaseous pesticides along the length of the screw housing 28'. Air supply inlet 72' provides the enriched air to air piping channel 130. Channel 130 is provided with apertures 132 which direct CO$_2$ enriched air and/or gaseous pesticides to the underside of the leaves of the plant 34' contained within plant holder 32', as well as to the underside of the leaves of the plant situated in a like manner in the adjacent grow line. Plant holder 32' extends downwardly to approximately the mid-point of support block 30' to provide more positive movement control.

Figure 11:
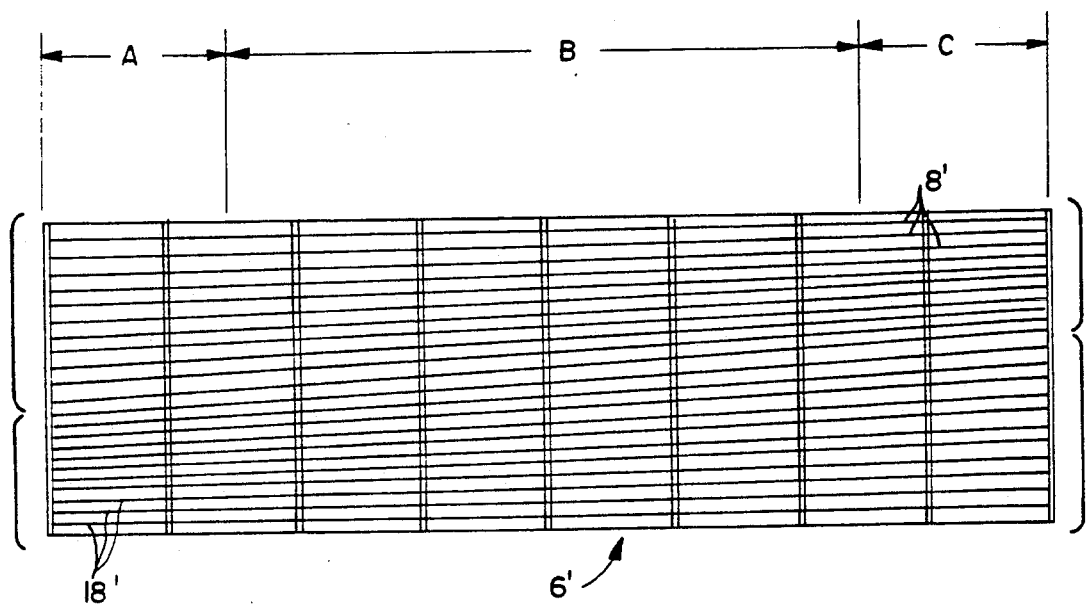
FIG. 11 is a schematic view of an alternate layout of grow lines for one module.

FIG. 11 depicts an alternate embodiment of the layout of grow lines 8' and 18' within module 6'. Grow lines 8' and 18' are arranged in a divergent pattern over the cellular water table, without incorporating any curvature in the grow lines 8' and 18'.

The following Example is intended to further describe the invention, but should not be considered to limit the scope of the invention in any way.

EXAMPLE

Although many flowers, fruits and vegetables can be grown in the system of the invention, leaf lettuce has been chosen as an example starting crop. There are a number of reasons for the selection of lettuce as the starting crop. The production economics are attractive because lettuce grows fast, needs less space, requires fewer production operations, attracts fewer diseases and pests, and most of the fully grown plant is edible.

The greenhouse of the Example contains three modules according to the invention, each of which incorporates 20-24 grow lines.

Before seeding, die cut sponges are placed in plant holders, the fourth side of the holder is snapped on and the plant holders are arranged in a nursery for the germination period. Seeds are placed in slits within each sponge within each plant holder, and the plant holder is placed in a germination box or in a nursery water table and marked with the date. Depending on the season and the variety of plant, the seedlings stay in the germination box for 1 day and in the nursery water table for about 10-14 days. The seedlings are then culled, placed in a small transportable water table, moved to the grow lines of the present invention and fed into the slot guides of the variable pitch screw housing.

At this point, the roots are long enough to reach down from the grow line screw housing to the water level. The grow lines are suspended over a cellular water table in modules which may preferably be 8' wide and 124' to 128' in length. Each cell is approximately 4' by 8' with removable white plastic bottom panels for easy cleaning. The white bottoms also reflect sunlight onto the lower leaves and undersides of the leaves to aid growth and enhance product quality, with fewer light-starved yellow leaves to remove at harvest.

As the plants grow, they need more space. Longitudinal spacing is provided by the variable pitch screw with comparatively fine threads at the planting end to very coarse threads at the harvest end, and intermediate pitches according to the growth curve (size, measured in linear or weight units, vs. days of growth) of the plants. For example, if 25 plants are each about $1\frac{1}{2}''$ by $1\frac{1}{2}''$ when transplanted from the nursery, then the screw pitch is such that when 25 plant holders are fed into the drive screw, they would occupy approximately $1\frac{1}{2}'' \times 25 = 37\frac{1}{2}''$ longitudinally along a given grow line. Fifteen days later at harvest, plants which are approximately 6" by 6" would occupy $6'' \times 25 = 150''$ of grow line. The growth curve is different for each variety of plant.

Lateral spacing is accomplished by arranging the grow lines in a divergent pattern over the water table, with plant end spacing at $1\frac{1}{2}$ to 2", fanning out to 6" at harvest end. The lateral spacing of the grow lines is also spaced according to the growth curve so that they are approximately parallel for any particular day's growth, i.e., 2" apart for the first 50" and 6" apart for the last 150". The roots are not in a trough but are free to spread out, as are the leaves, thereby providing four-way spacing. This allows the water to pass more freely, without the damming effect of troughs. It also facilitates cleaning of the roots and allowing them to develop fine hair-like feeders essential for good growth.

To optimize space, 10-12 lines diverge one way and the next 10-12 lines run in the opposite direction, so both planting and harvesting operations are occurring simultaneously at both ends of the greenhouse. Because young plants are shorter than harvest size plants, the interface between the two halves of an 8' module may be spaced to reduce any shading. For example, if the greenhouse runs east-west, the sun passes along its length shining from the south, most markedly in the winter. If a 6" plant is south of an adjacent $1\frac{1}{2}''$ plant, it will throw a shadow. Correct spacing will minimize any such shadow.

As the plants mature, they are supplied with both air and water at the correct temperatures over short distances (preferably every 4' to 8') only 2-3 inches from the plants so that the convection of air plus radiation of nutrient water provide good growing temperatures up through the plant leaves. Air movement through the leaves is critical to prevent various diseases and to prevent a layer of stagnant air from coating the leaves.

The plants are spaced within the module as they mature in the manner previously described until harvest (approximately 15 days).

It is to be understood that the forms of the invention herein shown and described are to be taken as preferred embodiments of the same, and that various changes in shape, material, size and arrangement of parts may be resorted to without departing from the spirit of the invention or scope of the subjoined claims.

What is claimed is:

1. A grow line for supporting and moving plants through a hydroponic garden environment in a controlled manner, which grow line comprises:
    a) a rotatable elongate cylindrical member provided with a variable pitch helical groove along the length thereof;
    b) an elongate housing enclosing the cylindrical member and including a longitudinal slot in the wall of the housing, the slot extending substantially for the length of the cylindrical member;
    c) at least one plant holder for supporting a plant and engagement means carried by the holder for disposition within the longitudinal slot of the housing and engaging the helical groove of the cylindrical member for supporting the holder in a cantilever manner from the housing and moving the holder along the grow line upon rotation of the cylindrical member; and
    d) conduit means carried by the housing and positioned substantially thereabove, the conduit means including means for directing treatment fluids from substantially above the housing outwardly and directly to the undersides of the leaves of the plant supported by the holder.

2. The grow line of claim 1 further including means for supporting the housing within the hydroponic garden environment and reinforcing means disposed between the housing and the support means for securing the housing in position.

* * * * *